Patented Sept. 22, 1942

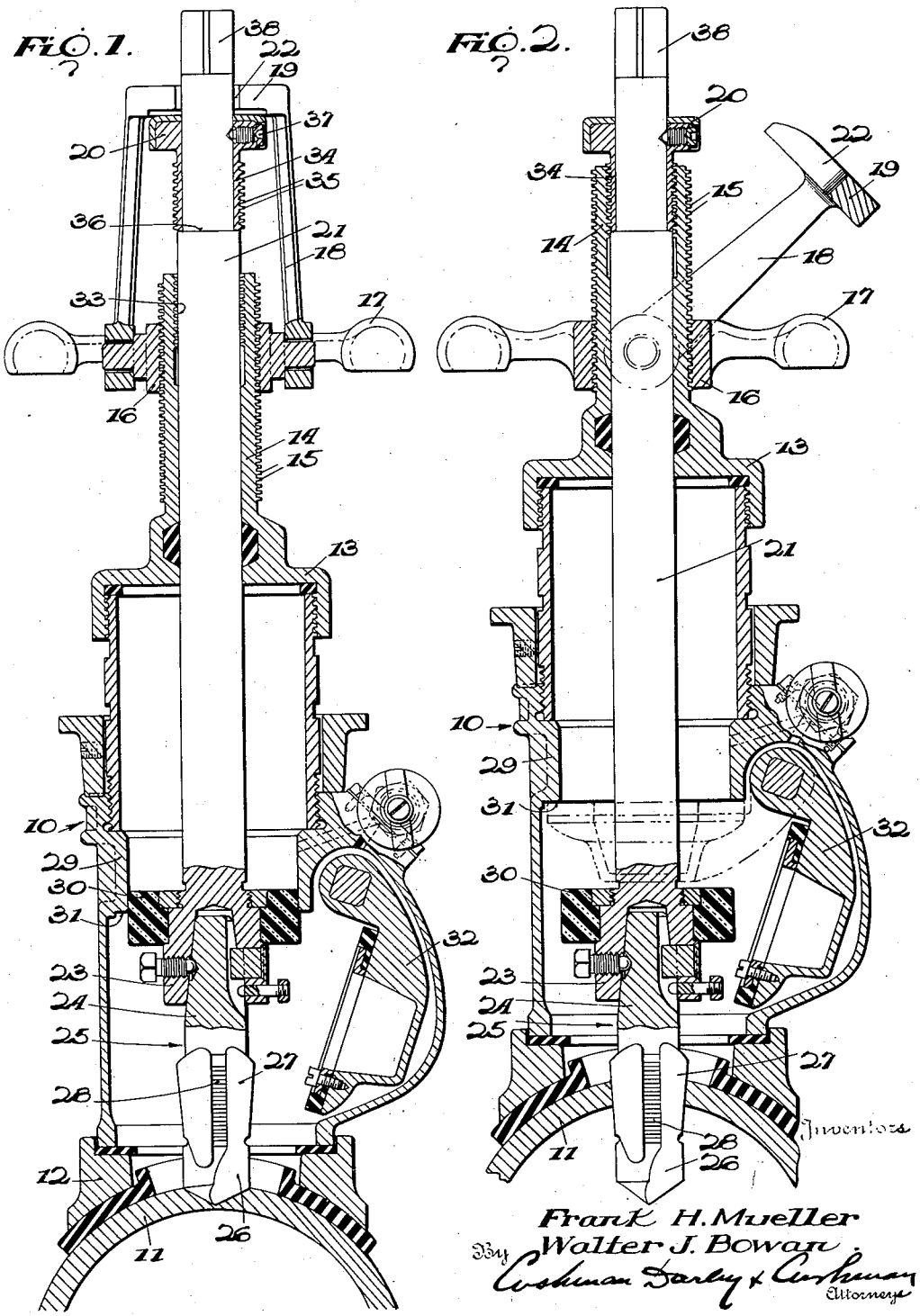

2,296,651

UNITED STATES PATENT OFFICE 2,296,651

DRILLING APPARATUS

Frank H. Mueller and Walter J. Bowan, Decatur, Ill., assignors to Mueller Co., Decatur, Ill., a corporation of Illinois Original application July 17, 1940, Serial No. 346,052. Divided and this application December 12, 1941, Serial No. 422,769

6 Claims. (Cl. 77—38)

This invention relates to drilling and tapping machines and is particularly concerned with such machines wherein the drilling and tapping are accomplished as consecutive operations of a single tool. In the type of machine particularly contemplated herein, the tool is carried by a boring bar which can be manually rotated and advanced in the customary manner to drill an opening in a main. The present invention has as its purpose to provide means superseding the advancing means used in the drilling operation so that during tapping the boring bar is accurately advanced in conformity with the pitch of the tapping portion of the tool. In this manner a clean and accurate tapping operation is assured.

In the accompanying drawing we have shown one embodiment of the invention by way of illustration and the description will proceed with reference thereto.

In the drawing:

Figure 1 is an axial section of drilling and tapping apparatus according to the invention at the start of the drilling operation, showing also in partial transverse section a main with which the apparatus is associated, and Figure 2 is a similar section showing the relation of parts during the tapping operation.

Referring to the drawing, reference numeral 10 designates generally a barrel or housing seated at its lower or inner end on a main 11 through the intermediary of a saddle 12 and suitable sealing means and secured in position in the usual manner. A cap 13 is threaded on the upper or outer end of the barrel and has an extension or neck 14 provided with external threads 15 which are engaged by a feed nut 16 equipped with handles 17. The feed nut has pivoted thereto a yoke 18 with a cross portion 19 swingable over a thrust collar 20 on a boring bar 21, the cross portion 19 having a recess 22 which provides clearance for the upper portion of the bar. The boring bar is rotatable and reciprocable in a bore of neck 14 coaxial with the barrel 10.

At its lower end the boring bar is formed with a head 23 provided with a socket in which is engaged the stem portion 24 of a bit or tool 25 which has a drilling portion 26 surmounted by a tapping portion 27 including threads 28. As here shown, the barrel has an internal constriction 29 providing a cylindrical guide surface for a centering disc 30, and a shoulder 31 at the lower extremity of the constriction serves as a seat for a flop valve 32, but these features are not essential to the invention to be hereinafter claimed and appear only incidentally.

At its upper end the bore of neck 14 is provided with internal threads 33 which have the same pitch as the threads 28 of the tapping portion 27 of tool 25. Collar 20 has a depending portion 34 provided with external threads 35 cooperable with the threads 33. The collar is seated downwardly against a shoulder 36 of the boring bar and is secured to the bar by any suitable means such as a set screw 37.

During the drilling operation shown in Figure 1 the bar is turned by a tool applied to its upper squared extremity 38 and is advanced by threading nut 16 downwardly on neck 14, thrust being transmitted to the bar through the yoke 18 and collar 20. At this time, and throughout the drilling operation, threads 35 are out of the range of threads 33 and are consequently without effect.

As the drilling operation is completed and the tapping portion of the tool is about to engage the drilling hole, threads 35 come into engagement with threads 33 and yoke 18 is swung away from collar 20, Figure 2, since the use of the feed nut 16 is no longer required. Continued rotation of the bar, due to the coaction of threads 35 and 33 causes the bar to be advanced in exact conformity with the pitch of the tap so that the latter can do its work without being subjected to any strain incident to the drag of the boring bar or to the uncoordinated effect which would result if it were attempted to assist the tap by advancing the bar through the use of the feed nut and yoke.

It will be seen that we have provided means which become automatically effective to advance the bar in conformity with the pitch of the tap upon the completion of the drilling operation.

The invention is not confined to the particular form and arrangement of parts herein disclosed, but is susceptible of variation in these matters without departure from its scope as defined in the claims.

This application is a division of our application Serial No. 346,052, filed July 17, 1940.

We claim:

1. In a drilling and tapping machine, a barrel adapted to be disposed in substantially radial relation to a main to be drilled and tapped, a cap closing the outer end of the barrel, a boring bar rotatable and reciprocable in a bore in said cap and equipped to carry at its inner end a bit comprising drilling and tapping portions, manually operable means for rotating and advancing the bar for drilling a hole, and means automatically effective upon continued rotation of the bar after completion of the drilling operation for advancing the bar in conformity with the pitch of said tapping portion.

2. In a drilling and tapping machine, a barrel adapted to be disposed in substantially radial relation to a main to be drilled and tapped, a cap closing the outer end of the barrel, a boring bar rotatable and reciprocable in a bore in said cap and equipped to carry at its inner end a bit comprising drilling and tapping portions, said cap having a threaded portion coaxial with said bar, manually operable means for rotating and advancing the bar for drilling a hole, and threads carried by said bar in a position out of range of said threaded portion during the drilling operation but coming into engagement with said threaded portion after the completion of the drilling operation so that upon continued rotation of the bar the same is advanced in conformity with the pitch of said tapping portion.

3. In a drilling and tapping machine, a housing adapted to be mounted on a main to be drilled and tapped, a bar in said housing equipped at its inner end to carry a bit including drilling and tapping portions, said housing having an outer extension through which said bar passes, means for advancing said bar through said housing to drill an opening in the main, threads on said extension of the same pitch as the tapping threads of the bit, and threads on said bar spaced beyond the threads on said extension during the drilling operation, the threads on said bar being positioned thereon to engage the threads on said extension when said bar is advanced to the point where the tapping portion of the bit enters the opening previously drilled in the main.

4. In a drilling and tapping machine, a housing adapted to be mounted on a main to be drilled and tapped, a bar in said housing equipped at its inner end to carry a bit including drilling and tapping portions, said housing having a bonnet on its outer end, said bonnet including an extension having a bore through which said bar passes, means on the extension of said bonnet for advancing said bar through said housing to drill an opening in the main, threads in the bore of said extension of said bonnet of the same pitch as the tapping threads of the bit, and a removable sleeve secured on said bar having threads thereon spaced beyond the threads in said bore during the drilling operation, said sleeve being positioned on said bar so that its threads engage the threads in said bore when said bar is advanced to the point where the tapping portion of the bit enters the opening previously drilled in the main.

5. In a drilling and tapping machine, a housing adapted to be mounted on a main to be drilled and tapped, a bar in said housing equipped at its inner end to carry a bit including drilling and tapping portions, a collar on said housing having means for operatively engaging said bar to force the same longitudinally toward the main, said collar and housing having relatively heavy engaging threads for forcing said bar toward the chamber upon rotation of said collar on said housing, whereby said bit is longitudinally advanced during the operation of drilling an opening through the wall of the main, threaded means on said bar of the same pitch as the threads of the tapping portion of said bit, and cooperating threads on said housing engaged by the threads on said bar to regulate the advance of said bar during the subsequent operation of the bit in tapping the previously drilled opening in the wall of the main.

6. In a drilling and tapping machine, a barrel adapted to be disposed in substantially radial relation to a main to be drilled and tapped, a removable cap closing the outer end of the barrel, a boring bar rotatable and reciprocable in a bore in said cap and equipped to carry at its inner end a bit comprising drilling and tapping portions, an outward extension on said cap having a bore through which the bar extends and having external threads, a feed nut engaging the threads of said extension, a thrust collar removably secured to said bar beyond said extension, disengageable means between said nut and collar for transmitting thrust to advance the bar while the latter is rotated to drill a hole in the main, said collar including an externally threaded portion and said extension having internal threads engageable thereby, said threaded portion being out of the range of said internal threads during the drilling operation but coming into engagement therewith during continued rotation of the bar after completion of the drilling operation for advancing the bar in conformity with the pitch of said tapping portion.

FRANK H. MUELLER.
WALTER J. BOWAN.